(12) United States Patent
Kijima et al.

(10) Patent No.: US 6,801,670 B2
(45) Date of Patent: Oct. 5, 2004

(54) IMAGE READING APPARATUS AND SHADING CORRECTION DATA ACQUIRING METHOD

(75) Inventors: Satoru Kijima, Kanagawa (JP); Tsunao Honbo, Kanagawa (JP); Shigeo Aoyagi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 515 days.

(21) Appl. No.: 09/841,985

(22) Filed: Apr. 25, 2001

(65) Prior Publication Data

US 2002/0003908 A1 Jan. 10, 2002

(51) Int. Cl.$^7$ .................................................. G06K 9/40
(52) U.S. Cl. ........................ 382/274; 358/1.9; 358/461
(58) Field of Search ............................... 382/274, 275, 382/254; 358/1.9, 474, 448, 461, 455, 456

(56) References Cited

U.S. PATENT DOCUMENTS

| | | | | |
|---|---|---|---|---|
| 4,888,492 A | * | 12/1989 | Arimoto | 358/448 |
| 5,062,144 A | * | 10/1991 | Murakami | 382/274 |
| 5,317,421 A | * | 5/1994 | Ito | 358/464 |
| 5,864,408 A | * | 1/1999 | Kumashiro | 358/461 |
| 5,920,656 A | * | 7/1999 | Gahang | 382/274 |
| 6,292,269 B1 | * | 9/2001 | Kawai | 358/1.9 |
| 6,600,579 B1 | * | 7/2003 | Kumagai et al. | 358/474 |

* cited by examiner

Primary Examiner—Yon J. Gouso
(74) Attorney, Agent, or Firm—Morgan & Finnegan, LLP

(57) ABSTRACT

Shading correction data used in an image reading apparatus for shading-correcting image data obtained by reading an original image by a line sensor is acquired. A defect position on a white reference plate and a defect correction coefficient for correcting shading correction data at this defect position are obtained, and the shading correction data at the defect position is corrected by using the defect correction coefficient. Shading correction is performed by using the corrected shading correction data.

38 Claims, 13 Drawing Sheets

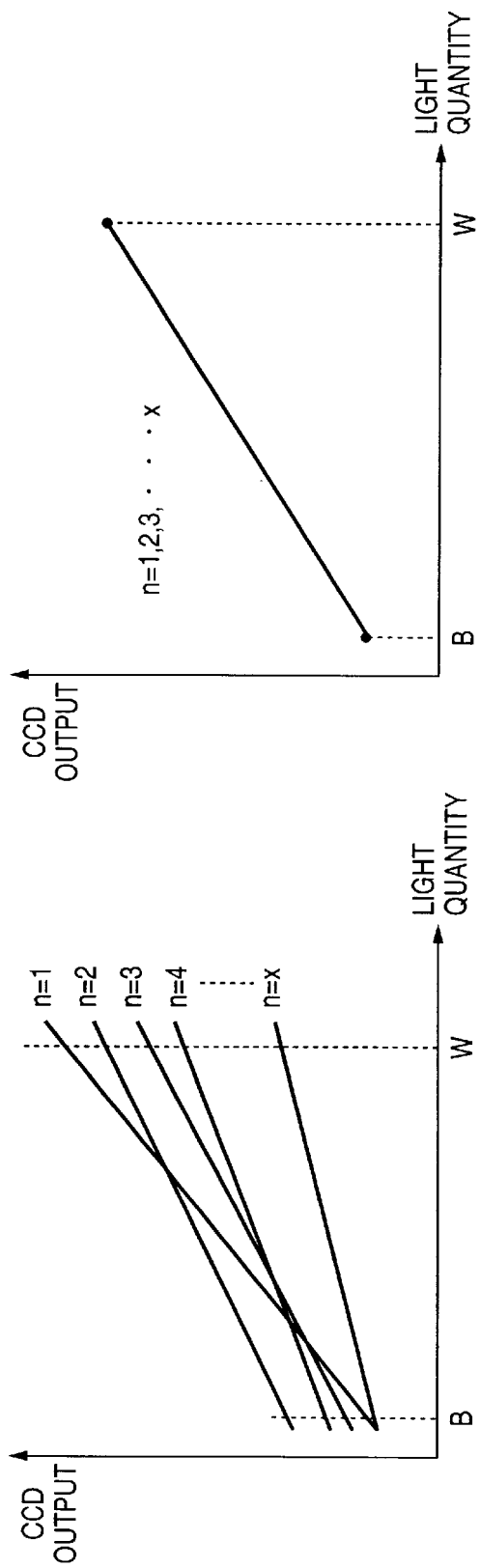

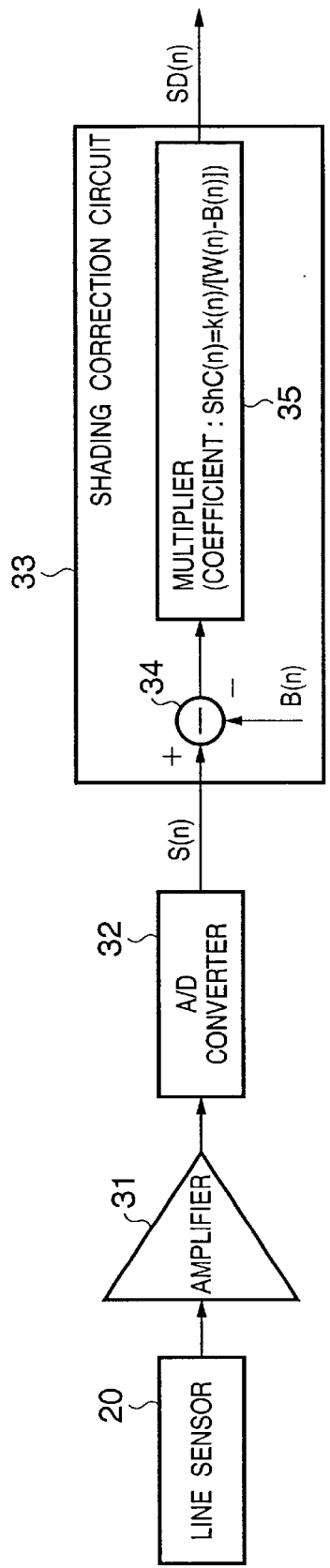

IMAGE READING APPARATUS AND SHADING CORRECTION DATA ACQUIRING METHOD

FIELD OF THE INVENTION

The present invention relates to an image reading apparatus and shading correction data acquiring method and, more particularly, to an image reading apparatus for reading a shading correction plate (in general, a white reference plate having a reference density) which has a uniform reference density and extends in the main scan direction, by using a line sensor constituted by a plurality of photoelectric conversion elements one-dimensionally aligned in the main scan direction, creating and storing shading correction data on the basis of an output from each photoelectric conversion element, and shading-correcting, by using the shading correction data, data of an original image that is read by each photoelectric conversion element, a shading correction method applied to the image reading apparatus, and a storage medium which stores a program for executing the shading correction method.

BACKGROUND OF THE INVENTION

FIGS. 1 and 2 are a side sectional view and perspective view, respectively, showing the schematic arrangement of a general image reading apparatus.

An original cover holding an original 12 is set on a platen 10. The original 12 is irradiated from its lower side with light emitted by a light source 15. The light reflected by the original 12 enters a line sensor 20 via a lens 14. The line sensor 20 has photoelectric conversion elements (CCDs) one-dimensionally aligned in the main scan direction. Each CCD converts the received light into an electrical signal, thereby obtaining electrical signals corresponding to an image (for one scan line) of the original 12 in the main scan direction.

After the original is read by one scan line, a motor 62 moves a reading unit 13 by one scan line in a direction (subscan direction) indicated by the arrow X in FIG. 2. Then, an image of the next scan line is similarly read. This operation is repeated to read the entire original 12.

An image signal read by the line sensor 20 is influenced by variations in the sensitivities of the CCDs, variations in dark current, and irregularities in light quantity from an optical system. As for x CCDs which constitute the line sensor 20, the light quantity of the light source 15 and an output from each CCD have a relationship as shown in FIG. 3A. That is, input/output characteristics are different between the CCDs. To eliminate these influences and make the input/output characteristics of all the x CCDs coincide with each other, as shown in FIG. 3B, CCD output correction (called "shading correction") is done.

Shading correction is performed as follows.

The motor 62 moves the reading unit 13 to a position (to be referred to as a "home position" hereinafter) where a shading correction plate (reference white plate) 11 attached to the end of the platen 10 is read. At this position, an output from each CCD of the line sensor 20 when the light source 15 is turned on to irradiate the shading correction plate 11 is stored as correction data W(n). (n) means the nth CCD. Then, an output from each CCD of the line sensor 20 when the light source 15 is turned off (or light is shielded) is stored as correction data B(n).

When an image of the original 12 is read next time, these correction data are read out, and shading correction is performed for each CCD by $$SD(n) = k(n) \cdot [(S(n) - B(n))]/[(W(n) - B(n))]$$

where $S(n)$ is the output data from the nth CCD, $B(n)$ is the correction data of the nth CCD when the light source 15 is OFF (to be referred to as OFF correction data of the nth CCD hereinafter), $W(n)$ is the correction data of the nth CCD when the light source 15 is ON (to be referred to as ON correction data of the nth CCD hereinafter), $k(n)$ is the coefficient of the nth CCD, and $SD(n)$ is the shading-corrected data for the output data from the nth CCD.

FIG. 4 is a block diagram showing the peripheral arrangement of a shading correction circuit.

An A/D converter 32 converts an analog signal output from the nth CCD of the line sensor 20 into a digital value $S(n)$ via an amplifier 31. In a shading correction circuit 33, a subtracter 34 subtracts OFF correction data $B(n)$ of the nth CCD from the digital output value $S(n)$ of the nth CCD, and a multiplier 35 multiplies the difference by shading correction data $ShC(n)$ to obtain shading-corrected data $SD(n)$. The shading correction data $ShC(n)$ is given by $k(n)/[W(n)-B(n)]$.

OFF correction data $B(n)$, ON correction data $W(n)$, shading correction data $ShC(n)$, and the like change for each pixel of the CCD, so that correction in the shading correction circuit 33 is executed for each pixel of the line sensor.

In this manner, output variations between CCDs are corrected, and the original 12 is more faithfully read.

The conventional shading correction method, however, suffers the following problem.

Dirt or dust attached to the shading correction plate 11 makes ON correction data $W(n)$ erroneous. At a portion where a defect such as dirt or dust exists on the shading correction plate 11, this defect decreases the output level of the CCD. If shading correction is performed by using ON correction data $W(n)$ obtained from the CCD corresponding to the defect portion of the shading correction plate 11, an output from that CCD is excessively corrected, and a stripe is formed on the read image.

For example, assume that dirt 21 is attached to the shading correction plate 11, as shown in FIG. 5A. ON correction data $W(n)$ obtained by reading the shading correction plate 11 decreases in level at a position β under the influence of the dirt 21, as represented by a curve 501. Shading correction is done by using this ON correction data $W(n)$ so as to make corrected data $SD(n)$ flat (ideal value) at the positions of all the CCDs, as shown in FIG. 5B. Hence, shading correction data $ShC(n)$ has an irregular portion γ, as represented by a curve 502 in FIG. 5A.

If a uniform-density original is read, each CCD outputs output data $S(n)$ as represented by a curve 601 in FIG. 6. The output data $S(n)$ is shading-corrected by multiplying it by shading correction data $ShC(n)$ represented by the curve 502 (the same data as the curve 502 in FIG. 5A). The obtained shading-corrected data $SD(n)$ has a projection δ, as represented by a line 603.

In other words, the irregular portion δ is generated on the shading-corrected data $SD(n)$ under the influence of the excessively corrected portion (projection γ of the curve 502 of FIG. 6) of the shading correction data $ShC(n)$ due to the dirt 21. The irregular portion 6 appears as a stripe of the read image.

To solve this problem, there is provided a method of reading a shading correction plate before image reading to create shading correction data, reading the shading correction plate at another position after displacement in the subscan direction, performing shading correction by using the shading correction data, and detecting from this result the presence/absence of defects of the shading correction plate at the portion where the shading correction plate is first read. If a defect exists, the reading portion is displaced in the subscan direction to search for a nondefective portion and shading correction data is created there. If no nondefective portion is found, shading correction data is created at a portion having fewest defects.

However, the following problems occur in the conventional shading correction using the method of reading the shading correction plate at another position displaced in the subscan direction.

(1) The operation is performed every time before image reading, so image reading takes a long time.

(2) Strict quality management of reducing defects on the shading correction plate is required on the assumption that the shading correction plate has a position free from any dirt in the subscan direction.

(3) When no nondefective position is found in the subscan direction on the shading correction plate, shading correction data is created at a portion having fewest defects. Hence, the influence of the defects inevitably appears on the image.

SUMMARY OF THE INVENTION

The present invention has been made in consideration of the above situation, and has as its object to provide an image reading apparatus for detecting defects such as dirt on a shading correction plate and removing the influence of the defects, a shading correction method, and a storage medium.

According to the present invention, the foregoing object is attained by providing an image reading apparatus comprising a line sensor, control means for controlling a reading position by the line sensor, a reference density member, average data acquiring means for acquiring average shading data on the basis of image data obtained by reading the reference density member by the line sensor at a plurality of positions in a subscan direction, and specifying means for specifying a defect position of the reference density member on the basis of the average shading data and image data obtained by reading the reference density member at a predetermined position.

According to the present invention, the foregoing object is also attained by providing a shading correction data acquiring method in an image reading apparatus having a line sensor, control means for controlling a reading position by the line sensor, and a reference density member, comprising an average data acquiring step of acquiring average shading data on the basis of image data obtained by reading the reference density member by the line sensor at a plurality of positions, and a specifying step of specifying a defect position of the reference density member on the basis of the average shading data and image data obtained by reading the reference density member at a predetermined position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 3A is a graph showing the output characteristics of x CCDs having different input/output characteristics as a function of the light quantity of a light source;

FIG. 3B is a graph showing the output characteristics of the CCDs when shading correction makes the input/output characteristics of all the x CCDs coincide with each other;

FIG. 4 is a block diagram showing the peripheral arrangement of a shading correction circuit;

DETAILED DESCRIPTION OF THE PREFERRED EMBODIMENT

A preferred embodiment of the present invention will be described in detail in accordance with the accompanying drawings.

Figure 1:
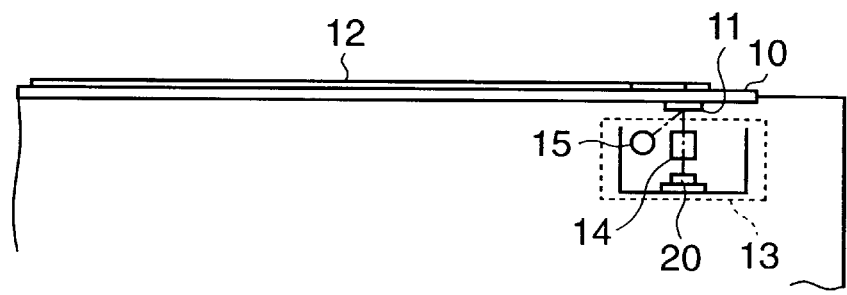
FIG. 1 is a side sectional view showing the schematic arrangement of a general image reading apparatus.
Figure 2:
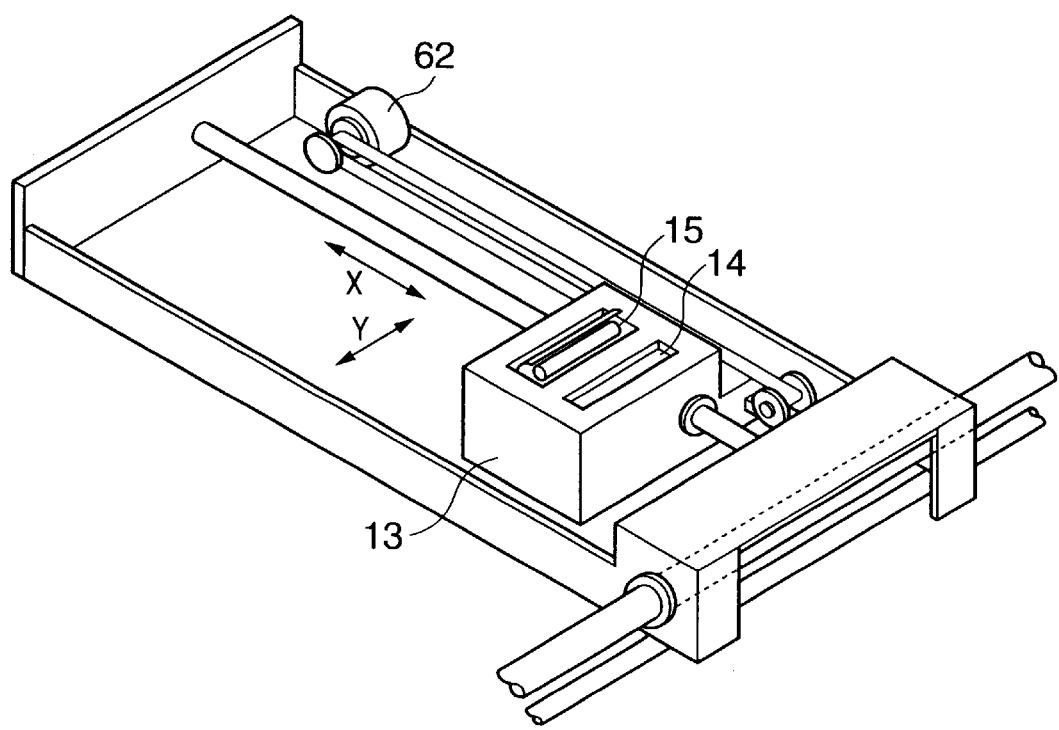
FIG. 2 is a perspective view showing the schematic arrangement of the general image reading apparatus.

The arrangement of an embodiment of an image reading apparatus according to the present invention is basically the same as that of the image reading apparatus shown in FIGS. 1 and 2, and a description of the image reading apparatus according to the present invention adopts the description of the image reading apparatus shown in FIGS. 1 and 2.

Figure 14:
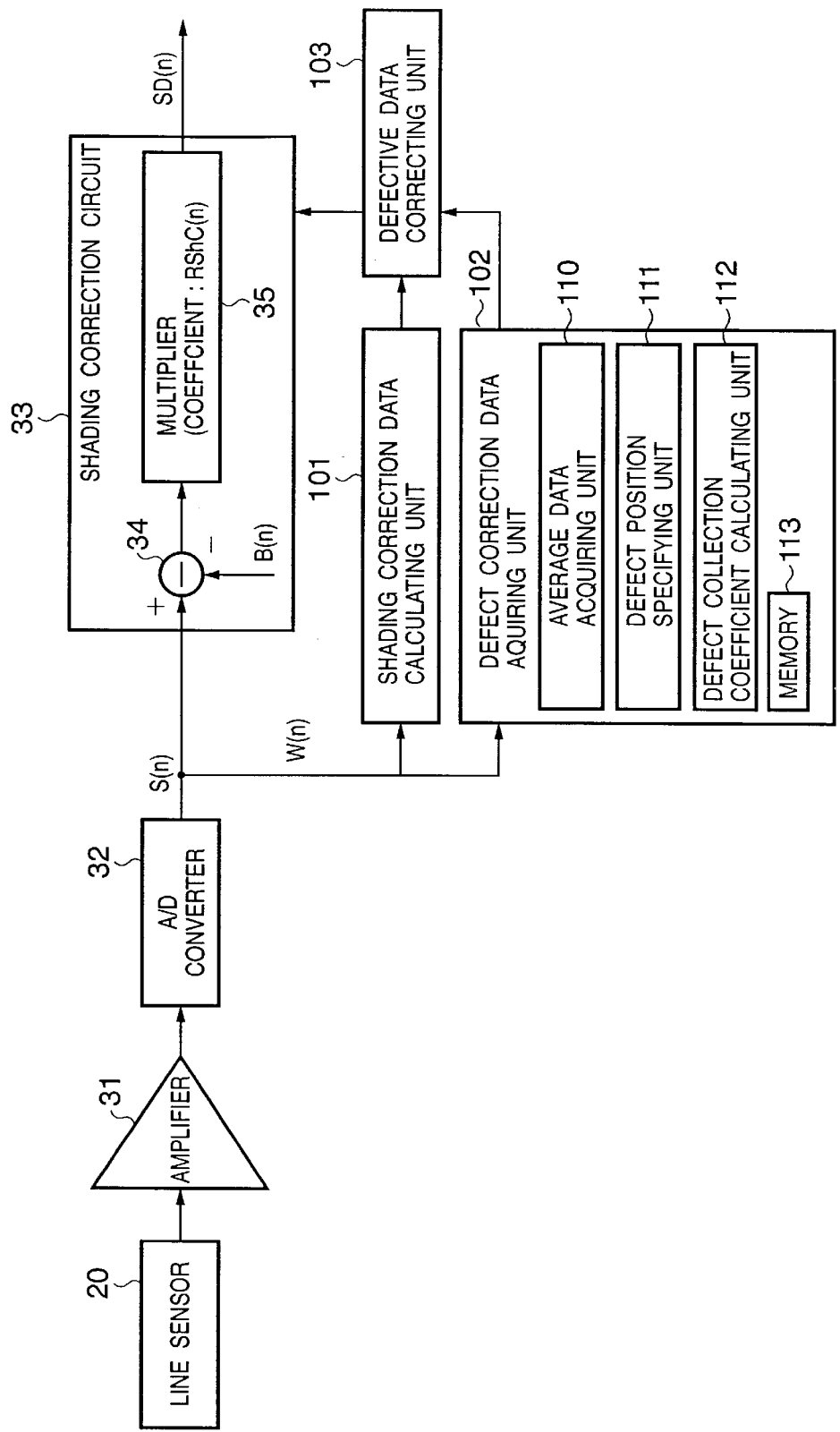
FIG. 14 is a block diagram showing the peripheral functions of a shading correction circuit in the embodiment of the present invention.

FIG. 14 is a block diagram showing the peripheral functions of a shading correction circuit in the embodiment of the present invention. In FIG. 14, the same reference numerals as in the arrangement of FIG. 4 denote the same parts, and a description thereof will be omitted.

In FIG. 14, reference numeral 101 denotes a shading correction data calculating unit for acquiring shading correction data by a known method; and 102, a defect correction data acquiring unit for specifying a defect such as dust or dirt on a shading correction plate 11 and acquiring a correction coefficient. The defect correction data acquiring unit 102 includes an average data acquiring unit 110, defect position specifying unit 111, defect correction coefficient calculating unit 112, and memory 113. Reference numeral 103 denotes a defective data correcting unit.

Shading correction data acquiring operation in the image reading apparatus having this arrangement will be explained in detail.

Figure 7:
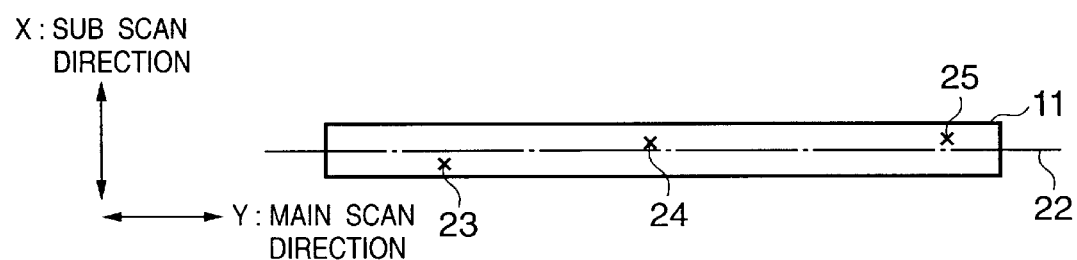
FIG. 7 is a view showing a shading correction plate in an embodiment of the present invention.

FIG. 7 is a view showing the shading correction plate 11 in the embodiment of the present invention when viewed from a line sensor 20.

In FIG. 7, reference numeral 22 denotes a home position on the shading correction plate 11; and 23 to 25, defects such as dust or dirt on the shading correction plate 11. According to the prior art, shading correction data is obtained at the home position 22. According to the present invention, shading correction data are obtained at a plurality of positions in the subscan direction except for the home position 22 on the shading correction plate 11, and the defect position of dust or the like included in an image on the shading correction plate 11 that is attained at the home position 22 is specified by using the shading correction data. Then, data at the defect position is replaced by data acquired at a position other than the home position 22 to obtain shading correction data free from the influence of the defect. The method of the present invention will be described in detail.

Figure 8:
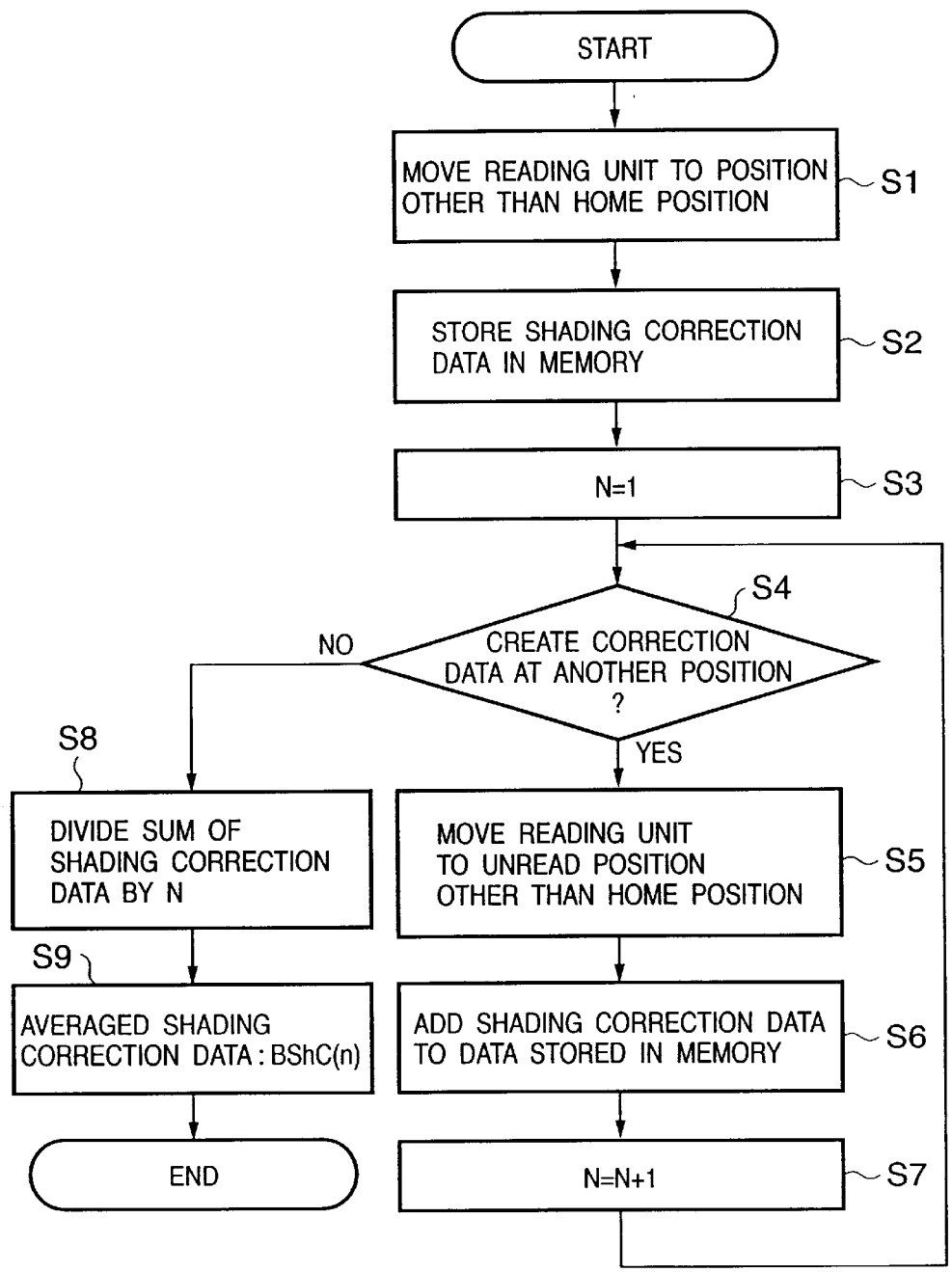
FIG. 8 is a flow chart showing shading correction data creation processing procedures in the embodiment of the present invention.

FIG. 8 is a flow chart showing shading correction data creation processing procedures in the image reading apparatus according to the present invention. In this processing, shading correction data are obtained at a plurality of positions in the subscan direction other than the home position 22 on the shading correction plate 11, and an average BShC(n) is calculated for each CCD.

A reading unit 13 is driven by a motor 62 (step S1) to read an image of one main scan line at a position different from the home position 22 on the shading correction plate 11 in the subscan direction. The average data acquiring unit 110 of the defect correction data acquiring unit 102 calculates shading correction data ShC(n) on the basis of the read data, and stores it in an internal memory (not shown) (step S2). The number N of lines for the read image of one main scan line is set to 1 (step S3). An example of the obtained shading correction data is shown in FIG. 9.

Figure 5A:
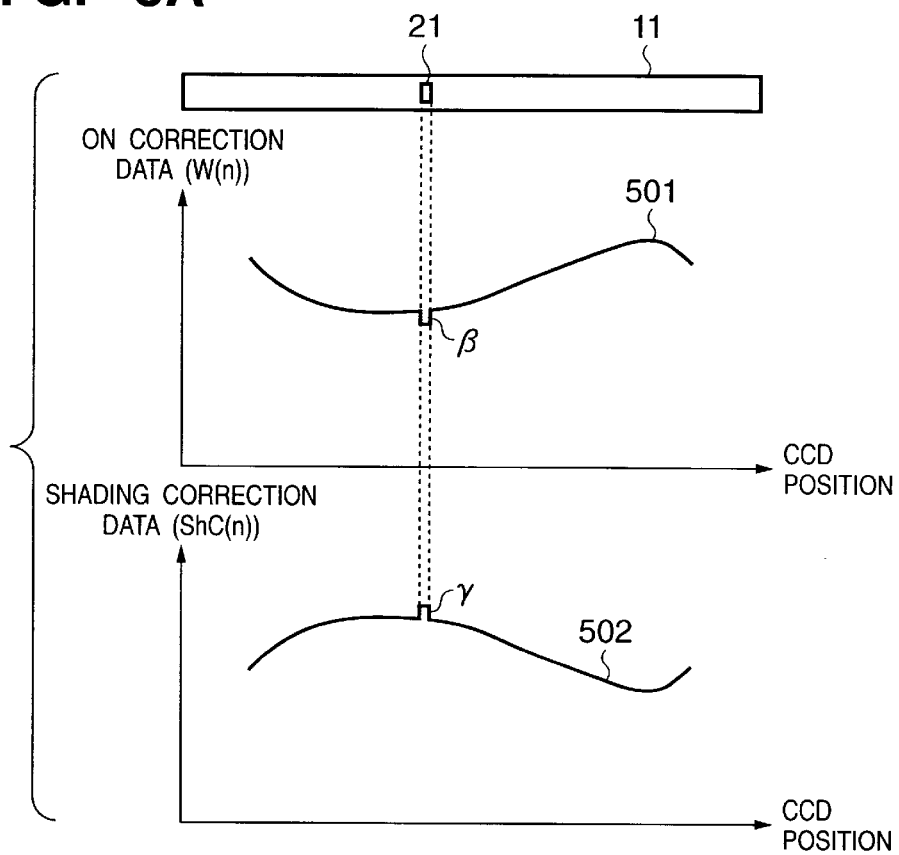
FIG. 5A is a view for explaining the influence of dust attached to a shading correction plate in shading correction.
Figure 5B:
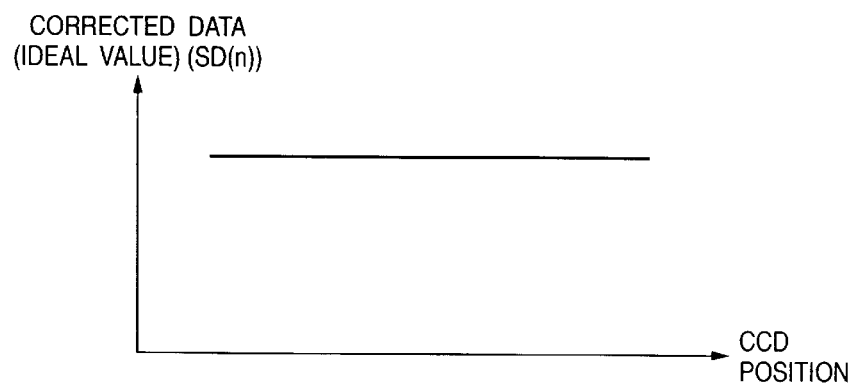
FIG. 5B is a graph showing ideal data after read data of the shading correction plate is shading-corrected.
Figure 6:
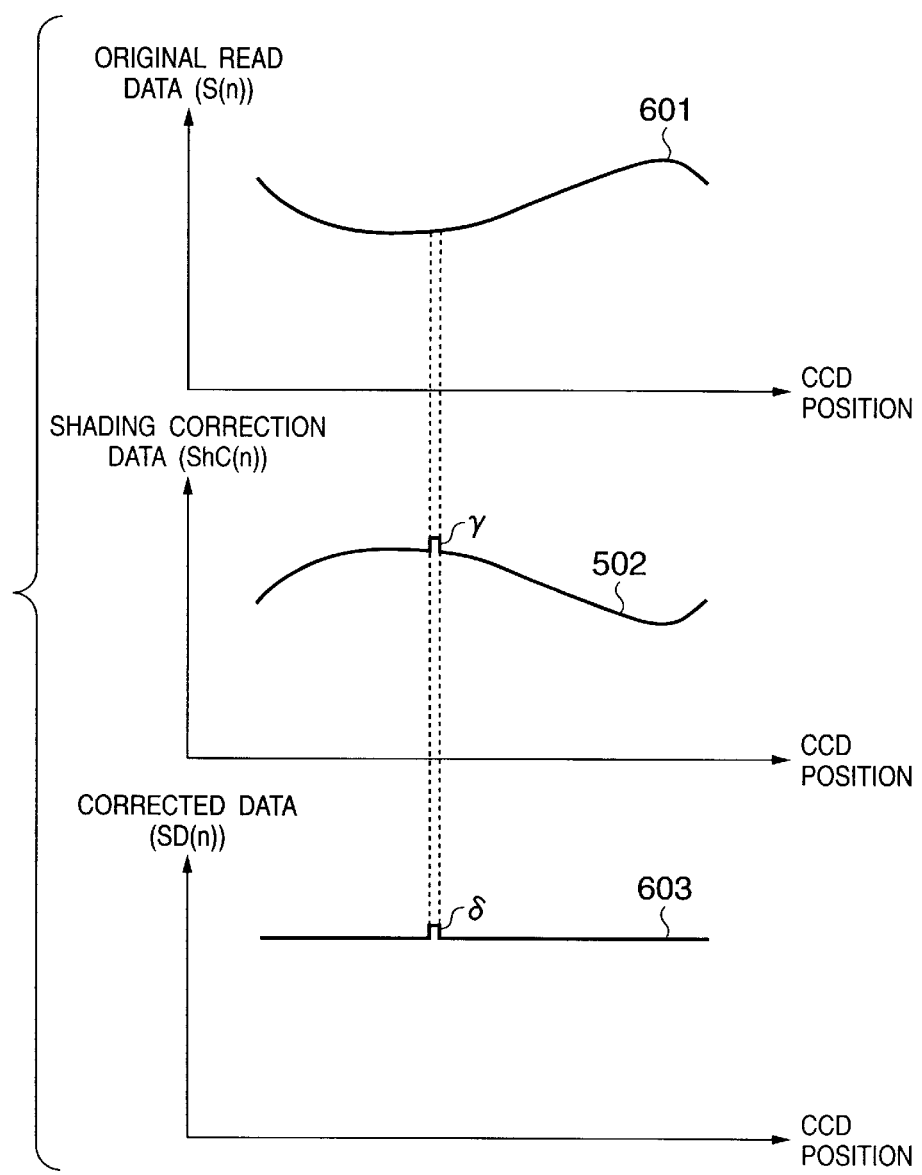
FIG. 6 is a view for explaining the influence of dust attached to the shading correction plate in shading correction.
Figure 9:
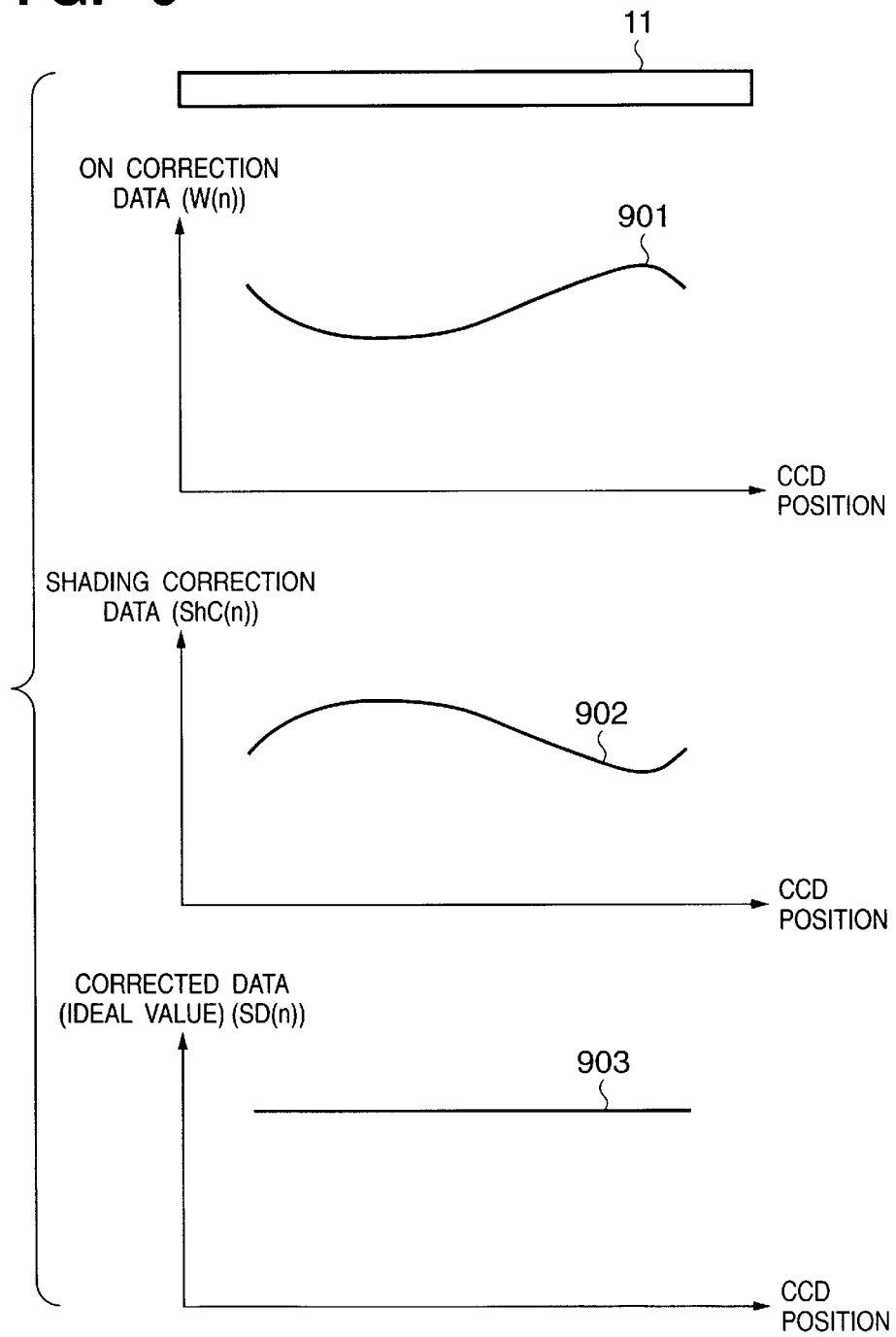
FIG. 9 is a view for explaining acquisition of shading correction data when a shading correction plate free from any dust is read.

In FIG. 9, reference numeral 11 denotes a shading correction plate free from any defect such as dust. A curve 901 represents ON correction data W(n) attained by reading this shading correction plate 11; a curve 902, shading correction data ShC(n) in this case; and a line 903, data SD(n) after the read data of the shading correction plate 11 is shading-corrected. If dust or the like is attached to the shading correction plate 11, these curves become those shown in FIG. 5A.

It is determined whether to drive the reading unit 13 by the motor 62, read an image of one main scan line at a position different from the home position 22 on the shading correction plate 11 in the subscan direction, and create shading correction data ShC(n) (step S4). If YES in step S4, the reading unit 13 is displaced to an unread position different from the home position 22 in the subscan direction (step S5). Then, an image of one main scan line is read, and shading correction data ShC(n) is calculated based on this data. The calculated shading correction data ShC(n) is added for each CCD to the shading correction data ShC(n) stored in the memory (step S6). The number N of lines is incremented (step S7), and the flow returns to step S4.

If NO in step S4, the sum of shading correction data for each CCD that are stored in the memory is divided by the number N of lines (corresponding to the number of addition operations) (step S8) to determine the average BShC(n) of each CCD (step S9). The average BShC(n) is shading correction data attained by averaging shading correction data ShC(n) at respective positions other than the home position 22 on the shading correction plate 11.

In FIG. 8, shading correction data ShC(n) are added and averaged to obtain BShC(n). Alternatively, BShC(n) may be calculated by using a value prepared by adding and averaging ON correction data W(n) (curve 901 in FIG. 9) for creating shading correction data ShC(n).

Figure 10:
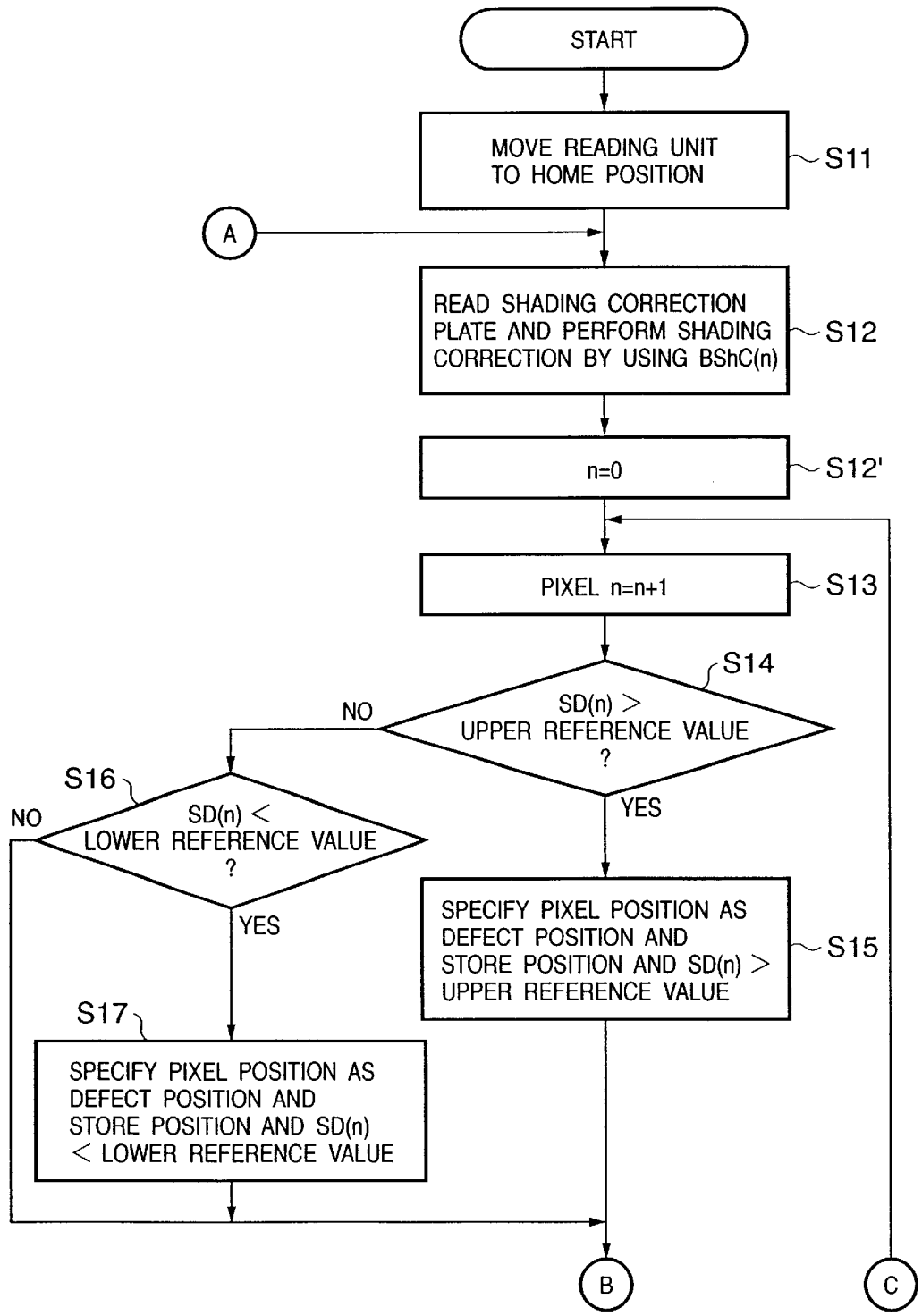
FIG. 10 is a flow chart showing shading correction data creation processing procedures in the embodiment of the present invention.
Figure 11:
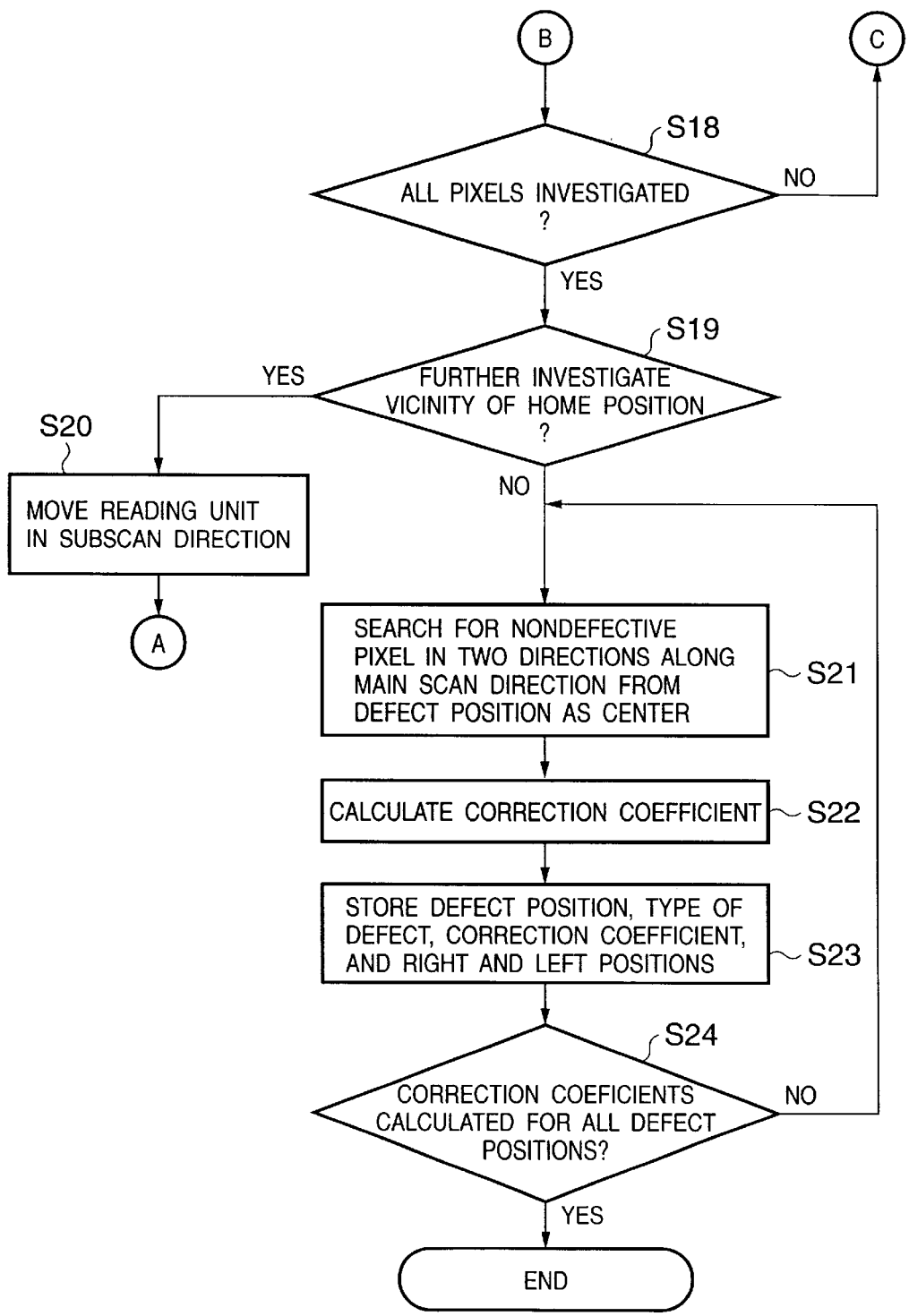
FIG. 11 is a flow chart showing shading correction data creation processing procedures in the embodiment of the present invention.

FIGS. 10 and 11 are flow charts showing processing procedures of specifying a defect position of shading correction data obtained at the home position 22 by using the defect position specifying unit 111 and calculating a correction coefficient at the defect position by using the defect correction coefficient calculating unit 112.

The reading unit 13 is moved to the home position 22 (step S11) to read the shading correction plate 11, and shading correction is performed by using the averaged shading correction data BShC(n) (step S12).

Figure 12:
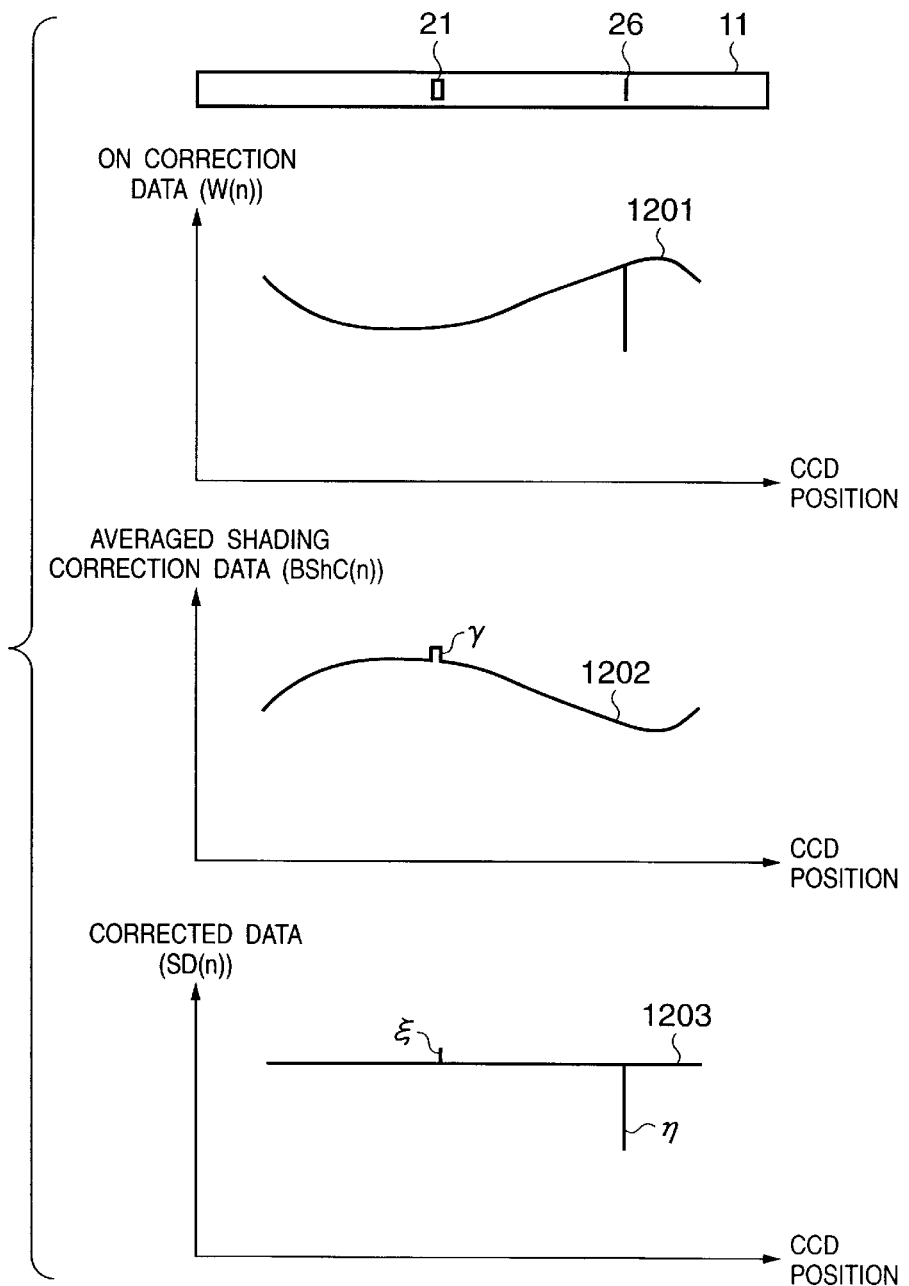
FIG. 12 is a view for explaining acquisition of shading correction data in the embodiment of the present invention when a shading correction plate having dust is read.

When the shading correction plate 11 is read at the home position 22 to find a defect 26, as shown in FIG. 12, the obtained ON correction data W(n) is represented by a curve 1201. Assume that an inappropriate portion γ exists in the averaged shading correction data BShC(n), as represented by a curve 1202. When read data represented by the curve 1201 is shading-corrected by using the averaged shading correction data BShC(n) represented by the curve 1202, the shading-corrected data is converted as represented by a line 1203. The defect 26 at the home position 22 on the shading correction plate 11 generates a low-output-level portion η on the line 1203 whose data should originally be flat. The inappropriate portion γ of the averaged shading correction data BShC(n) generates a high-output-level portion ε.

To detect a pixel corresponding to the defect 26 or inappropriate portion γ, the corrected data (data represented by the line 1203) is compared with upper and lower reference values (steps S14 and S16) for each pixel (each CCD output) (steps S12' and S13). The upper and lower reference values are levels higher and lower by a predetermined value than a flat output level which should originally be obtained. If the corrected data SD(n) at a pixel of interest is larger than the upper reference value (YES in step S14), an inappropriate portion is determined to exist at a position n of the pixel of interest in the averaged shading correction data BShC(n), and the pixel position n and the presence of the inappropriate portion are stored (step S15). If the corrected data at the pixel n of interest is smaller than the lower reference value (NO in step S14 and YES in step S16), a defect is determined to exist at the home position 22 on the shading correction plate 11 at the pixel of interest, and the pixel position n and the presence of the defect at the home position 22 are stored in the memory 113 (step S17). Processing from steps S13 to S17 is executed for all pixels (all CCDs) (step S18).

In many cases, the size of the defect 26 included in the shading correction plate 11 is smaller than the position control precision in controlling the reading unit 13 to the home position 22. Even if, therefore, the reading unit 13 is moved to the home position 22, the defect 26 may or may not be detected. To always detect the defect 26, the shading correction plate 11 is read by a plurality of lines around the home position 22 in the subscan direction, and the defect position and its type are added to information which has already been detected and stored (steps S19 and S20). This can reduce the influence of the position control precision at the home position 22.

After that, a pixel (CCD) determined to be nondefective is searched in two directions along the main scan direction from, as a center, the position of the defect (meaning both the defect 26 and inappropriate portion γ) (step S21). The positions of pixels found first are set as "right and left positions". Alternatively, positions apart from the defect by a predetermined number of pixels from the pixels found first may be set as "right and left positions".

A correction coefficient (e) for averaged shading correction data BShC(e) at the pixel of defective position (n=e) is calculated by using shading correction data BShC(r) and BShC(l) at the pixels of "right position" (n=r) and "left position" (n=l) by equation (1) (step S22):

$$\text{Correction Coefficient } (e) = BShC(e)/\{BShC(r)+BShC(l)\} \quad (1)$$

Alternatively, the correction coefficient (e) for averaged shading correction data BShC(e) at the pixel of defective position may be calculated by equation (2):

$$\text{Correction coefficient } (e) = BShC(e)/\{(BShC(r)+BShC(l))/2\} \quad (2)$$

The correction coefficient, right position (r), and left position (l) are stored in the memory 113 together with the defect position (e) and the type of defect (step S23).

Processing from steps S21 to S23 is executed for all defects (inappropriate portions) specified in steps S15 and S17 (step S24).

In this embodiment, all defects (inappropriate portions) are specified, correction coefficients are calculated, and various pieces of information including the correction coefficients are stored in the memory. For example, for a small memory capacity, the type of defect may be removed from the information, and a set of a defect position, correction coefficient, and right and left positions may be stored in the memory. Instead of storing information about all defects, information about only a defect at or near the home position may be stored in the memory.

The processes shown in FIGS. 8, 10, and 11 are executed prior to image reading pre-processing shown in FIG. 13 (to be described later).

Figure 13:
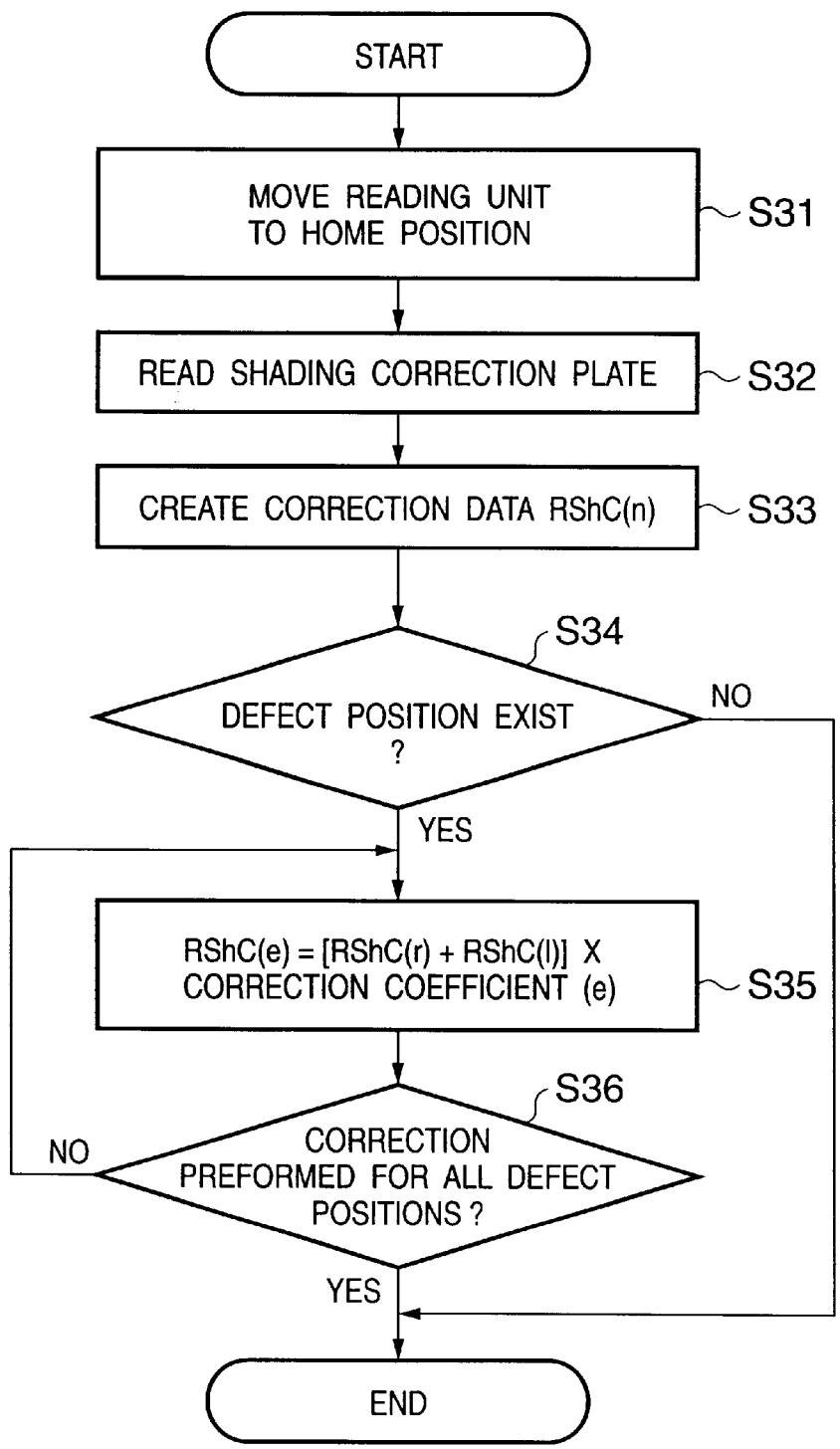
FIG. 13 is a flow chart showing shading correction data creation processing procedures in the embodiment of the present invention.

FIG. 13 is a flow chart showing processing procedures performed by a shading correction circuit 33 in order to correct shading correction data obtained at the home position 22.

Similar to conventional image reading pre-processing, the reading unit 13 is moved to the home position 22 (step S31) to read the shading correction plate 11 (step S32). The shading correction data calculating unit 101 creates shading correction data RShC(n) for each pixel (each CCD) (step S33).

If no defect position exists in the processes shown in FIGS. 8, 10, and 11 that have been executed in advance (NO in step S34), the shading correction data RShC(n) created in step S33 can be directly used, so that processing ends (i.e., the defective data correcting unit 103 is passed). If YES in step S34, processing advances to step S35, and the defective data correcting unit 103 extracts one of pieces of information about a defect position, correction coefficient, and right and left positions that are stored as a set for each defect in the memory 113. Then, shading correction data RShC(e) at the defective pixel is calculated based on equation (3) (step S35). Equation (3) adopts equation (1) for calculation of the correction coefficient:

$$RShC(e) = \{RShC(r)+RShC(l)\} \times \text{Correction Coefficient } (e) \quad (3)$$

When equation (2) is employed for the correction coefficient, the shading correction data RShC(e) at the defective pixel is calculated by:

$$RShC(e) = \{(RShC(r)+RShC(l))/2\} \times \text{Correction Coefficient } (e) \quad (4)$$

Processing in step S35 is executed for shading correction data RShC(n) obtained at the pixels of all defect positions that are stored in the memory (step S36).

As described above, shading correction data are attained at positions other than the home position 22 on the shading correction plate 11, and the defect position of dust or the like at the home position 22 on the shading correction plate 11 is specified by using these shading correction data. Shading correction data at the defect position is corrected by using the shading correction data obtained at the positions other than the home position 22, thereby obtaining the final shading correction data.

This embodiment corrects shading correction data in image reading of the shading correction plate 11, but performs defect detection requiring a longer time before image reading of the shading correction plate 11. This solves problem (1) of a long image reading time.

Even if the shading correction plate 11 includes many defects, this embodiment corrects defective shading correction data by using shading correction data at nondefective portions. This solves problem (2) of strict quality management required to reduce defects on the shading correction plate.

Similarly, even if the shading correction plate 11 includes many defects, the present invention corrects defective shading correction data by using shading correction data at nondefective portions. This solves problem (3) of the influence of defects appearing on an image because shading correction data is created at a portion having fewest defects.

As has been described above, according to the present invention, shading correction data are obtained at positions other than the home position on a shading correction plate, and the defect position of dust or the like at the home position on the shading correction plate is specified by using these shading correction data. Shading correction data at the defect position is corrected by using the shading correction data obtained at the positions other than the home position, thereby obtaining the final shading correction data.

Shading correction data free from the influence of defects can be obtained without adding any special device, and thus image irregularities and the like caused by defects can be prevented.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts in FIGS. 8, 10 and 11 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image reading apparatus, comprising:
    a line sensor;
    a moving unit adapted to move a reading position by said line sensor;
    a reference density member;
    an average data acquiring unit adapted to acquire average shading data on the basis of image data obtained by reading said reference density member by said line sensor at a plurality of positions in a subscan direction while moving the reading position by said moving unit;
    a specifying unit adapted to specify a defect position of said reference density member an the basis of the average shading data;
    a defect correction data acquiring unit adapted to acquire defect correction data for correcting shading correction data at the defect position;
    a defective data correcting unit adapted to correct the shading correction data at the defect position by using the defect correction data; and
    a shading correction unit adapted to shading correct image data obtained by reading an original image by said line sensor, by using the shading correction data corrected by said defective data correcting unit.

2. The apparatus according to claim 1, wherein said specifying unit specifies a defect position of said reference density member on the basis of the average shading data and image data obtained by reading said reference density member at a predetermined position.

3. The apparatus according to claim 1, wherein said defect correction data acquiring unit comprises:
    a calculating unit adapted to calculate the defect correction data for correcting shading the correction data at the defect position, by using the average shading data; and
    a memory adapted to store the defect position and the defect correction data in association with each other, and
    the plurality of positions are other than the predetermined position.

4. The apparatus according to claim 2, wherein when image data obtained by shading-correcting the image data obtained by reading said reference density member at the predetermined position by using the average shading data falls outside a predetermined range, said specifying unit specifies as the defect position a pixel position of said line sensor which corresponds to the corrected image data that falls outside the predetermined range.

5. The apparatus according to claim 4, wherein said specifying unit further specifies a type of defect at the specified defect position, and the apparatus further comprises a memory adapted to store the type of defect and the defect position in association with each other.

6. The apparatus according to claim 3, wherein said calculating unit calculates the defect correction data as a ratio between the average shading data at the defect position and a sum of the average shading data at right and left nondefective pixels near the defect position.

7. The apparatus according to claim 6, wherein said defective data correcting unit multiplies, by the defect correction data, the sum of the shading correction data at the right and left nondefective pixels near the defect position.

8. The apparatus according to claim 6, wherein said calculating unit uses the average shading data corresponding to pixel positions nearest to the defect position in right and left directions where image data obtained by shading-correcting the image data obtained by reading said reference density member at the predetermined position by using the average shading data fall within the predetermined range.

9. The apparatus according to claim 6, wherein said calculating unit uses the average shading data corresponding to pixel positions apart from the defect position by a predetermined number of pixels in right and left directions.

10. The apparatus according to claim 6, wherein said memory further stores positions of the right and left pixels in association with the defect position.

11. The apparatus according to claim 3, wherein said calculating unit calculates the defect correction data as a ratio between the average shading data at the defect position and an average of the average shading data at right and left nondefective pixels near the defect position.

12. The apparatus according to claim 11, wherein said defective data correcting unit multiplies, by the defect correction data, the average of the shading correction data at the right and left nondefective pixels near the defect position.

13. The apparatus according to claim 11, wherein said calculating unit uses the average shading data corresponding to pixel positions nearest to the defect position in right and left directions where image data obtained by shading-correcting the image data obtained by reading said reference density member at the predetermined position by using the average shading data fall within the predetermined range.

14. The apparatus according to claim 11, wherein said calculating unit uses the average shading data corresponding to pixel positions apart from the defect position by a predetermined number of pixels in right and left directions.

15. The apparatus according to claim 11, wherein said memory further stores positions of the right and left pixels in association with the defect position.

16. The apparatus according to claim 1, wherein said average data acquiring unit acquires the average shading data by averaging the shading correction data at a plurality of positions.

17. The apparatus according to claim 1, wherein said average data acquiring unit acquires the average shading data on the basis of an average of image data read at a plurality of positions.

18. The apparatus according to claim 1, further comprising:
    a determining unit that determines presence/absence of a defect position on the basis of a processing result by said specifying means, wherein when said determining unit determines absence of any defect position, correction processing of the shading correction data by said defective data correcting unit is skipped.

19. A shading correction data acquiring method in an image reading apparatus having a line sensor, a moving unit adapted to move a reading position by the line sensor, and a reference density member, comprising:
    acquiring average shading data on the basis of image data obtained by reading the reference density member by the line sensor at a plurality of positions in a subscan direction while moving the reading position by said moving unit;
    specifying a defect position of the reference density member on the basis of the average shading data;
    acquiring defect correction data for correcting shading correction data at the defect position;
    correcting the shading correction data at the defect position by using the defect correction data; and
    shading-correcting image data obtained by reading an original image by said line sensor by using the corrected shading correction data.

20. The method according to claim 19, wherein said specifying of a defect position of said reference density member is based on the average shading data and image data obtained by reading said reference density member at a predetermined position.

21. The method according to claim 19, wherein the acquiring of the defect correction data further comprises:
    calculating the defect correction data for correcting the shading correction data at the defect position, by using the average shading data; and
    storing the defect position and the defect correction data in association with each other, and
    the plurality of positions are other than the predetermined position.

22. The method according to claim 20, wherein in said specifying of the defect position, when image data obtained by shading-correcting the image data obtained by reading said reference density member at the predetermined position by using the average shading data thus outside a predetermined range, a pixel position of the line sensor which corresponds to the corrected image data that thus outside the predetermined range is specified as the defect position.

23. The method according to claim 22, wherein in said specifying of the defect position, a type of defect at the specified defect position is further specified, and the method further comprises storing the type of defect and the defect position in association with each other.

24. The method according to claim 21, wherein in said calculating of the defect correction data, a ratio between the average shading data at the defect position and a sum of the average shading data at right and left nondefective pixels near the defect position is calculated as the defect correction data.

25. The method according to claim 23, wherein when correcting the shading correction data at the defect position, the sum of the shading correction data at the right and left nondefective pixels near the defect position is multiplied by the defect correction data.

26. The method according to claim 24, wherein said calculating uses the average shading data corresponding to pixel positions nearest to the defect position in right and left directions where image data obtained by shading-correcting the image data obtained by reading said reference density member at the predetermined position by using the average shading data fall within the predetermined range.

27. The method according to claim 24, wherein said calculating uses the average shading data corresponding to pixel positions apart from the defect position by a predetermined number of pixels in tight and left directions.

28. The method according to claim 24, wherein in said storing positions of the right and left pixels are further stored in association with the defect position.

29. The method according to claim 21, wherein in said calculating of the defect correction data, a ratio between the average shading data at the defect position and an average of the average shading data at right and left nondefective pixels near the defect position is calculated as the defect correction data.

30. The method according to claim 29, wherein when correcting the shading correction data at the defect position, the average of the shading correction data at the right and left nondefective pixels near the defect position is multiplied by the defect correction data.

31. The method according to claim 29, wherein said calculating uses the average shading data corresponding to pixel positions newest to the defect position in right and left directions where image data obtained by shading-correcting the image data obtained by reading said reference density member at the predetermined position by using the average shading data fall within the predetermined range.

32. The method according to claim 29, wherein said calculating uses the average shading data corresponding to pixel positions apart from the defect position by a predetermined number of pixels in right and left directions.

33. The method according to claim 29, wherein in said storing positions of the right and left pixels are further stored in association with the defect position.

34. The method according to claim 19, wherein in said acquiring of the average shading data, the average shading data is acquired by averaging the shading correction data at a plurality of positions.

35. The method according to claim 19, wherein in said acquiring of the average shading data, the average shading data is acquired on the basis of an average of image data read at a plurality of positions.

36. The method according to claim 20, further comprising:
    determining presence/absence of a detect position on the basis of a processing result in said specifying of the defect position,
    wherein when absence of a defect position is determined in said determining correction processing of the shading correction data is skipped.

37. A computer program product comprising a computer usable medium having computer readable program code means embodied in said medium for a shading correction data acquiring method in an image reading apparatus having a line sensor, a moving unit adapted to move a reading position by the line sensor, and a reference density member, said product including:
    a first computer readable program code means for acquiring average shading data on the basis of image data obtained by reading the reference density member by the line sensor at a plurality of positions in a subscan direction while moving the reading position by said moving unit;
    a second computer readable program code means for specifying a defect position of the reference density member on the basis of the average shading data;
    a third computer readable program code means for acquiring defect correction data for correcting shading correction data at the defect position;

a fourth computer readable program code means for correcting the shading correction data at the detect position by using the defect correction data; and a fifth computer readable program code means for shading-correcting image data obtained by reading an original image by the line sensor, by using the corrected shading correction data.

38. The computer program product according to claim 37, wherein said third computer readable program code means comprises:

a sixth computer readable program code means for calculating the defect correction data for correcting the shading correction data at the defect position, by using the average shading data; and a seventh computer readable program code means for storing the defect position and the defect correction data in association with each other, and wherein the plurality of positions are other than the predetermined position.

* * * * *

UNITED STATES PATENT AND TRADEMARK OFFICE
CERTIFICATE OF CORRECTION

| | |
|---|---|
| PATENT NO. | : 6,801,670 B2 |
| APPLICATION NO. | : 09/841985 |
| DATED | : October 5, 2004 |
| INVENTOR(S) | : Kijima et al. |

It is certified that error appears in the above-identified patent and that said Letters Patent is hereby corrected as shown below:

Title page,
Insert Item -- [30] Foreign Application Priority Data,
Apr 28, 2000 (JP) ……………………….. 2000-131646 --.
[*] Notice, delete "by 515" and insert -- by 577 days --.

Signed and Sealed this

Fourth Day of July, 2006

JON W. DUDAS
*Director of the United States Patent and Trademark Office*